SHEET FEED CONTROL FOR DUPLICATING MACHINES

Original Filed Feb. 26, 1959 3 Sheets-Sheet 1

Inventor:
Edward M. Springer
By Kostka, Davis, Brewer + Brugman
Attys

SHEET FEED CONTROL FOR DUPLICATING MACHINES

Original Filed Feb. 26, 1959 3 Sheets-Sheet 2

Inventor:
Edward M. Springer
By Horton, Davis,
Brewer + Brugman Attys.

SHEET FEED CONTROL FOR DUPLICATING MACHINES

Original Filed Feb. 26, 1959 3 Sheets-Sheet 3

Inventor:
Edward M. Springer
By Horton, Dawe, Brewer + Brugman
Attys

United States Patent Office

Re. 25,825
Reissued July 27, 1965

25,825

SHEET FEED CONTROL FOR DUPLICATING MACHINES

Edward M. Springer, Chicago, Ill., assignor, by mesne assignments, to Heyer, Inc., Chicago, Ill., a corporation of Illinois Original No. 3,029,074, dated Apr. 10, 1962, Ser. No. 795,699, Feb. 26, 1959. Application for reissue Mar. 18, 1964, Ser. No. 363,318
18 Claims. (Cl. 271—61)

Matter enclosed in heavy brackets [ ] appears in the original patent but forms no part of this reissue specification; matter printed in italics indicates the additions made by reissue.

The present invention relates to duplicating machines, and more particularly to means for controlling the feeding of the copy sheets from the usual feed table to the machine.

In duplicating machines, a stack of copy sheets is placed on a feed table and fed singly from the stack to the machine. Various kinds of means have been devised heretofore for controlling the feeding of the sheets so that when the top sheet of the stack is removed and fed to the machine, the remaining sheets are held against removal. As the stack lowers in height as the feeding progresses, the means for preventing the feeding of the sheets below the top sheet must lower or otherwise become effective only in an area that progressively lessens in height. Among the difficulties encountered previously in effecting such control was non-uniformity of pressure of the control means as the stack lowered, as well as other difficulties.

A broad object of the invention is to provide novel means for controlling the feeding of copy sheets to a duplicating machine that effectively overcomes the difficulties referred to above, while producing new advantages.

Another and more specific object of the invention has to do with novel means for engaging the top sheet of the stack for controlling its separation from the stack by feeding means. Fingers for this purpose have previously been used but the manner in which they engage the sheets in the stack has not been uniform throughout the course of depletion of the sheets in the stack; more particularly, such fingers changed in their angular relation to the stack during the course of depletion of the stack, with consequent objectionable variation in control of release of the top sheet.

Another object therefore is to provide means for controlling copy sheets of the general character indicated, which includes control fingers which engage the top sheet of the stack and maintain their same predetermined angular relation to the stack of sheets throughout the course of depletion of the stack, with consequent greater control of feeding of the top sheet.

Another object is to provide means for controlling feeding of sheets, of the general character noted above, which includes a novel arrangement providing positive abutment means *movable to a stack locating position;* for *engaging* the leading edge of the stack of copy sheets whereby to facilitate placement of the stack in proper position for feeding, and in which the abutment means *is thereafter displaced from its locating position and* recedes from a blocking position *forwardly of the leading edge of the stack* gradually as the stack of sheets is depleted.

Still another object is to provide a novel feed table for a duplicating machine utilizing rotating feed wheels for feeding copy sheets from the feed table to the duplicating machine, which includes a novel arrangement for accommodating different adjusted positions of the feed wheels along their axis whereby to enable the feed wheels to be positioned adjacent the side edges of copy sheets of different widths and thus enable the feed wheels to lower to a full lowermost position notwithstanding side guides on the feed table which engage the copy sheets at the side edges.

Other objects and advantages of the invention will appear from the following detailed description taken in conjunction with the accompanying drawings in which.

Figure 1:
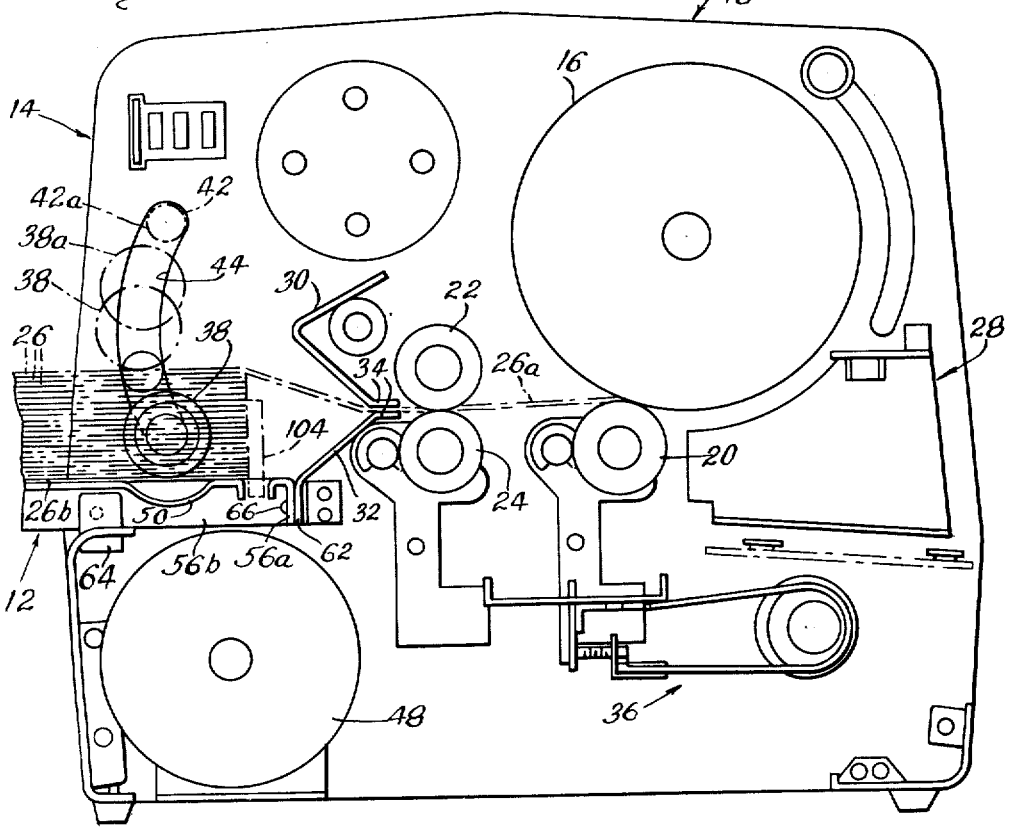
FIGURE 1 is a vertical fore-and-aft sectional view of a duplicating machine, and a portion of the feed table embodying the features of the present invention mounted therein, this view being in large part diagrammatic.

Referring now in detail to the drawings, attention is directed first to FIGURE 1 which shows in a general way a duplicating machine and a portion of a feed table embodying the features of the present invention mounted therein. The particular kind of duplicating machine illustrated is not a part of the present invention and hence the illustration thereof is simplified. The particular duplicating machine herein illustrated, however, may be of the form completely disclosed in my co-pending application Serial No. 661,460 filed May 24, 1957, now U.S. Patent No. 2,975,707. Specifically, the illustration of the duplicating machine in the present instance is similar to that illustrated in FIGURE 6 of the above-mentioned co-pending application. Referring to FIGURE 1 in the present case, a feed table indicated generally at 12 is shown mounted in the duplicating machine, which is indicated generally at 14. The duplicating machine includes a drum 16 mounted for rotation in and between a pair of side plates 18, one of which is shown, this drum being utilized for securing a master thereon in a suitable manner. Cooperating with the drum 16 is an impression roll 20. Adjacent the drum and impression roll, in anterior direction with respect to the direction of passage of copy sheets through the machine, is a pair of cooperating rolls which include a moistening roll 22 and a presser roll 24. A stack of copy sheets 26 is placed on the feed table 12 and are fed into the machine for passage between the rolls 22 and 24. and thereafter between the drum 16 and roll 20. The roll 22 is for the purpose of moistening each copy sheet as it passes thereby, and the two rolls 22 and 24 together grip the copy sheet therebetween and feed it to the drum 16 and roll 20. Thereafter, rotation of the drum 16 and roll 20 feeds the copy sheet therebetween, and subsequent to making an impression on the copy sheet from the master on the drum, the copy sheet is discharged into a receiving tray 28.

The copy sheets 26 on the feed table upon being fed successively therefrom into the machine, are guided into proper relation to the rolls 22 and 24 by means of deflectors 30 and 32 extending transversely across the machine and forming a concave receiving and deflecting zone operative for guiding the leading edges of the copy sheets between terminal portions 34 of the deflectors which are positioned for guiding the sheet to the bight of the rolls 22 and 24. The pressure of the rolls 20 and 24 on the corresponding members, namely drum 16 and roll 22, is controlled by a pressure means indicated generally at 36.

Figure 4:
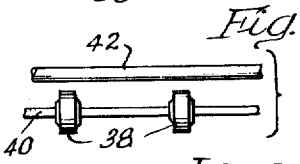
FIGURE 4 is a fragmentary front view of the feed wheels and associated elements of the duplicating machine.

The means for feeding the copy sheets from the feed table 12 into the machine includes a pair of feed wheels 38 shown in FIGURE 4, and one of which is shown in FIGURE 1 in various positions. These feed wheels 38 are mounted on a rotatable shaft 40 which extends through arcuate slots 42 (FIG. 1) in the side plates 18 for up and down movements therein. Associated with the feed wheels 38 and shaft 40 is a bar 42 positioned above the shaft 40 and secured in a rigid assembly therewith, serving as a means for grasping by hand for lifting the feed wheels 38. Upon rotation of the feed wheels 38 in appropriate direction, counterclockwise as viewed in FIGURE 1, the top copy sheet 26 is frictionally gripped thereby and fed from the top of the stack into the machine as indicated by the single copy sheet designated 26a in FIGURE 1.

Rotation of the feed wheels 38, as well as other moving parts of the duplicating machine, including the roll 22 and drum 16 which are positively driven, is effected by suitable drive means which may include a motor 48 and drive transmission means, all of which are disclosed in detail in the above mentioned co-pending application.

The assembly, including the shaft 40 and bar 42 in operation of the machine is adapted to be lowered by gravity, the feed wheels 38 resting on the top copy sheet of the stack. As the stack is depleted the assembly lowers toward the position shown in full lines of FIGURE 1 where only a single copy sheet remains. Upon removal of this last copy sheet here designated as 26b the feed wheels 38 drop into a trough or groove 50 formed in the feed table 12 and described more fully hereinafter. In the use of the duplicating machine and feed table, the operator grasps the rod 42 and lifts the assembly including that rod and the shaft 40 to the uppermost position shown at 38a and 42a. The assembly is latched in such position as disclosed fully in the above mentioned co-pending application, and while in that position the stack of copy sheets is placed on the table in the position shown in FIGURE 1; thereafter the assembly is released and let down on the stack to the position shown at 38b in which the feed wheels 38 engage and rest on the stack.

The foregoing description of the duplicating machine may be as disclosed in the above mentioned co-pending application, the portion hereinafter referring particularly to the specific invention of the present application. It is desirable that the feed wheels 38 (FIGURE 4) be made adjustable along the shaft 40 although such is not essential to the complete realization of the benefits of the present invention. One form of adjustable feed wheels 38 is shown in my co-pending application Serial No. 795,497 filed February 26, 1959, now U.S. Patent No. 2,937,725.

Reference is now made to the feed table 12 and details thereof. The feed table includes a table proper or panel 52 which may be a metal stamping and includes a top element or deck 54 of generally planar form but with certain modifications, forming a supporting surface for the stack of copy sheets. The feed table includes a depending flange or skirt 56 (FIGURES 6 and 9) preferably completely surrounding it, this flange or skirt including a front portion 56a and side portions 56b so specifically designated for ease in reference thereto hereinbelow. The front portion 56a (FIGURE 9) includes a pair of apertures 58 at transversely spaced locations preferably adjacent the sides of the feed table. The side portions 56b of the flange are provided with projections 60, adjacent the end having the portion 56a.

Figure 5:
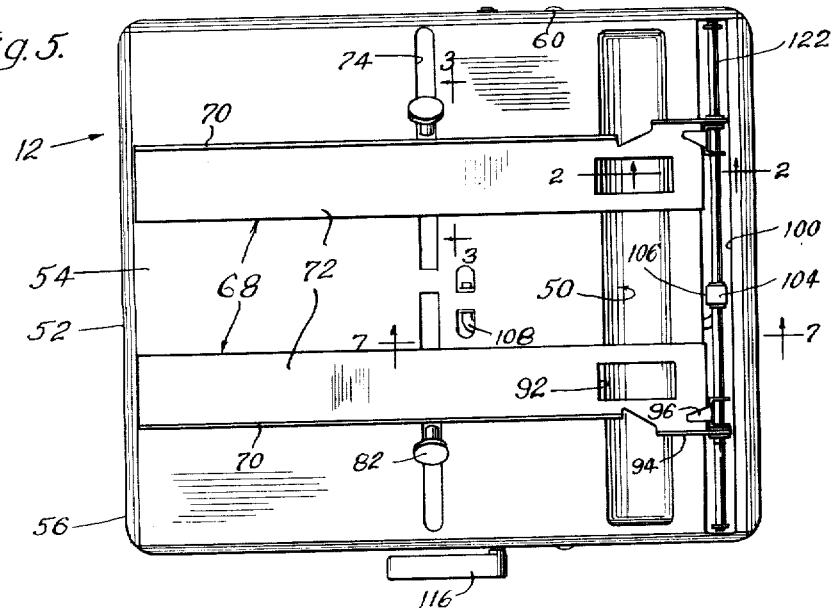
FIGURE 5 is a plan view of the feed table embodying the features of the present invention.

For convenience in making reference to the feed table, it may be assumed to have a leading end, or that which is disposed to the right in FIGURE 5, and shown in FIGURE 1, the copy sheets in being removed from the feed table when being fed into the machine, moving over this end of the feed table. The opposite end may be referred to as the outer end. The feed table is [demountedly] *demountable* or removably supported in its position in the duplicating machine by means of a lower depending flange 62 on the deflector 32 and clips 64 on the side plates 18. To mount the feed table in place, the leading end is projected into the space between the side plates in a downwardly and forwardly sloping direction and the flange portion 56a is butted against the flange 62 with the apertures [68] *58* receiving pins or projections 66 on the flange 62. The opposite and outer end is then lowered and the side portions 56b of the flanges are lowered into the spaces between the clips 64 and the respective slide plates 18. These spaces may be slightly greater than the thickness of the flange portions, but the projections 60 produce a wedging effect for frictionally holding the feed table in the position thus assumed. The feed table is thus supported by the flange 62 through the pins or projections 66, and the clips 64. The feed table is removed by movements in corresponding and opposite directions. The trough 50 referred to above is disposed adjacent the leading end of the feed table and extends transversely thereacross through the full range of adjusting movements of the feed wheels 38, which is substantially the full width of the feed table.

Figure 3:
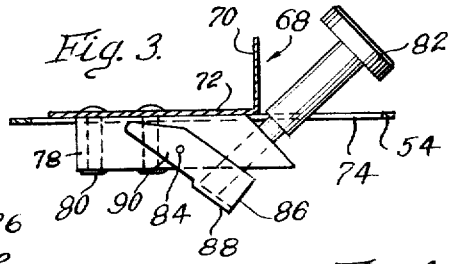
FIGURE 3 is a fragmentary sectional view of a suitable locking means for the side guides of the feed table, being taken at line 3—3 of FIGURE 5.
Figure 9:
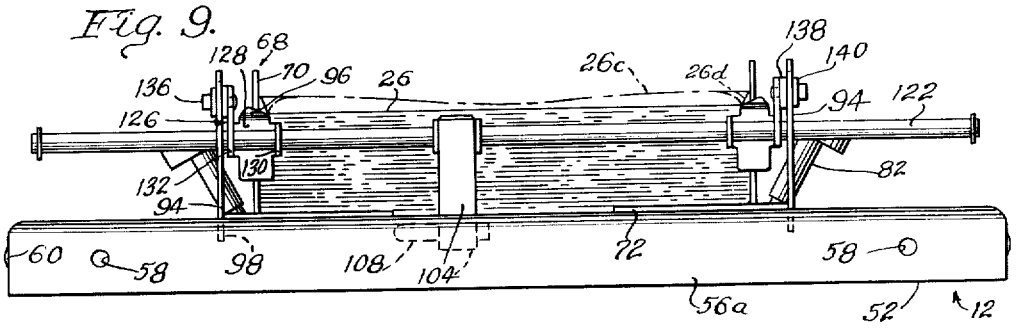
FIGURE 9 is a front view of the feed table, taken from the right of FIGURE 5, on an enlarged scale and including a stack of copy sheets.

The feed table is provided with adjustable side guides 68 for guidingly engaging the copy sheets at the side edges thereof and confining them against lateral displacement. These side guides are similar and symmetrical relative to each other and each is in the form of an angle member as shown in FIGURES 3 and 9. Each side guide includes a vertical flange 70 and a bottom horizontal flange 72 which abuts on and rests on the table top 54. These side guides are adjustable transversely toward and from each other for accommodating copy sheets of various widths. Any suitable means for providing the desired adjustments and locking the side guides in adjusted position may be employed such for example as that shown partially in FIGURES 5 and 6 and more fully in FIGURE 3. The feed table is provided with a slot 74 which preferably is in the form of two aligned segments for strength purposes, and associated with the slot is locking means indicated in its entirety at 76. This locking means includes a block 78 fitted in the slot and engaging the horizontal flange 72, being secured thereto as by rivets 80. A thumb screw 82 projects through the slot and has a threaded portion threaded through the block 78 and engaging one end of a lever 86 pivoted at 84 on the block 78. Preferably the lever member 86 is channel-shaped, having a web portion 88 which is engaged by the end of the thumb screw, and transversely spaced on portions 90 on the outer sides of the block 78. These arm portions 90 are disposed laterally beyond the side edges of the slot 74 so that upon tightening of the thumb screw 82 the member 86 is rotated clockwise (FIGURE 3) for bringing the opposite ends of the arm portions into friction and locking engagement with the undersurface of the table top member 54. Upon loosening the thumb screw 82 this friction and locking engagement is released and the side guides 68 may be moved toward and from each other to the desired adjusted positions.

Each side guide 68 has an aperture 92 in the bottom horizontal flange 72 thereof, in register with the transverse trough 50. These apertures receive the bottom portions of the feed wheels 38 upon removal of the last copy sheet from the stack on the feed table, it being preferred that the feed wheels be located at side marginal edges of the copy sheet for best feeding effect. It will be understood that in placing the stack of copy sheets on the feed table the side guides 68 are adjusted to a position spaced apart sufficient to enable easy insertion of the copy sheets, and then the stack is put in place and the side guides urged toward each other into engagement with the copy sheets. The copy sheets at their side portions rest on the bottom side flanges 72, while the vertical flanges 70 directly engage the side edges of the copy sheets. The positioning of the leading edges of the copy sheets at the leading end of the feed table will be described in detail hereinbelow. The side guides 68 at their ends adjacent the leading end of the feed table are provided with vertical flanges 94 which are spaced laterally outwardly of the vertical flanges 70, for accommodating control fingers 96 which are described in detail hereinbelow.

The vertical flanges 94 extend beyond the ends of the bottom horizontal flanges 72, in the direction of the leading end of the feed table, and having depending portions 98 which project downwardly through a transverse slot 100. This slot extends substantially the full width of the supporting surface of the feed table and is closely adjacent the leading end thereof and in addition to receiving the portions 98, receives other and movable parts, as described further hereinbelow. Along opposite edges of the slot 100 may be provided depending flanges 102, for strength purposes, the slot being formed, for example, as by a punching operation. Among the elements or members in or moving through the slot 100, as referred to above, is a post or stop 104 disposed adjacent the transverse center of the feed table. The post preferably is square, or at least has a planar surface 106 engageable by the leading edge of the stack of copy sheets. This post *moves up and down conjointly with vertical movements of the fingers 96 and* serves, *when moved to its raised locating position whereat the post is substantially vertical or normal to the plane of the feed table,* as positive abutment *or stop means* for engagement by the *leading edge of the stack of* copy sheets and accurately locates them *in proper feeding position* on the feed table.

The post 104 is mounted by means of an arm 108 pivoted at one end on the feed table on the under side, by means of tabs 110 formed as by a punching operation. The other and swinging end of the arm 108 is pivotally connected in the lower end of the post and in response to swinging movements of the arm, the post is raised *along an arcuate path to its locating position of FIGURE 8* and *likewise* lowered *to its FIGURE 7 position.* The arm 108 has a bowed or arcuate portion 112 for accommodating the trough 50 when the arm is in raised position, as in FIGURE 8.

Figure 7:
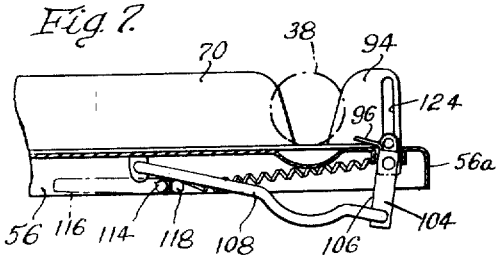
FIGURE 7 is a sectional view taken at line 7—7 of FIGURE 5.
Figure 6:
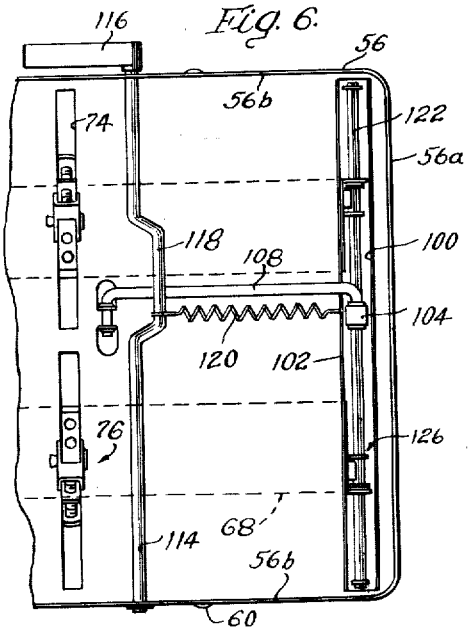
FIGURE 6 is a bottom view of the right-hand portion of FIGURE 5.

The means for swinging the arm 108 upwardly includes a shaft 114 rockbaly mounted in the flange portions 56b at the side edges of the feed table and thus disposed below the table top 54. The shaft 114 is provided with a handle *or crank* 116 disposed beyond [the] *one* flange portion 56b and exposed for [each] *easy* access for manual manipulation. The shaft 114 includes an offset or crank portion 118 in register with and engageable with the arm 108. A tension spring 120 is interconnected between the crank *portion* 118 and a fixed portion of the feed table such as the near flange 102, for biasing the crank *portion* 118 to an inoperative position which is that extending generally longitudinally of the feed table. Such a position is shown in FIGURES 6 and 7, in which the crank *portion* 118 is disposed generally at the same level as the main portion of the shaft 114 and the handle 116 extends horizontally in the opposite direction. Upon rotation of the handle 116 in appropriate direction (counterclockwise, FIGURES 7 and 8) the crank *portion* 118 engages the arm 108 and swings it upwardly, consequently raising the post 104. The shaft 114 is located relative to the pivot axis of the arm 108 and the crank portion 118 is of such radial projection as to cause the arm 108 and post 104 to be thrown the desired extent. When the crank *portion* 118 is in inoperative [operation] *position* (FIGURE 7) the arm 108 and post 104 are of course in lowered position. It is desired that sufficient friction be established between the crank *portion* 118 and the arm 108 that the movable parts remain in the position of FIGURE 8 when moved thereto and the handle released. In such position of the parts, the stack of copy sheets is placed on the feed table and butted against the *fully raised* post 104 to position the copy sheets as mentioned above. After the copy sheets are thus positioned, the handle 116 is manually released and moved toward the position of FIGURE [8] 7. The arm 108 and post 104 are enabled to lower *freely* under the direction *or influence* of gravity, *until or* unless restrained or limited by some other instrumentality, which they are by engagement of the fingers 96 with the top copy sheet of the stack, as explained more fully hereinbelow. *As the post 104 is lowered from its raised locating position of FIGURE 8, its upper end moves vertically downward with rod 122, and therefore conjointly with fingers 96 but its lower end moves generally along an arcuate path which is substantially vertical as determined by the fixed radius of arm 108. This compound movement of the post 104 serves to effectively prevent the post from dragging on the stack and thus interfering with the requisite free gravitational lowering of the fingers 96 as the stack is depleted by the paper feeding operation.*

A transverse rod or bar 122, which may be circular in cross section, is mounted in and supported at least partially by the post 104. The rod is projected through an aperture in the post adjacent the top of the latter and *is thereby rotatably* supported at a point adjacent the middle thereof, and is provided a limited degree of rocking movement *about the post 104 as a fulcrum* in a vertical transverse plane for evening the force of the fingers 96 on the stack of copy sheets, as explained more fully hereinbelow. The normal play provided between the rod and aperture in the post is sufficient for enabling the desired rocking movement *of rod 122*. The ends of the rod 122 are extended through vertical *guide* slots 124 in the flanges 94. These slots extend from adjacent the upper edge of the flanges to adjacent the lower end portions 98 thereof which project through the slot 100.

The fingers 96 are formed by extremities of finger members indicated in their entirety at 126 which are similar and symmetrical relative to each other so that a detailed description of one will suffice for both. These finger members 126 are slidably mounted and supported on the rod 122 and have *vertical guide* control engagement with the marginal edges of the [verical] *vertical* slots 124. Each finger member 126 as viewed in plan is generally U-shape, having a web portion 128, best seen in FIGURE 10, and flanges 130 and 132. The flanges 130 and 132 have aligned apertures slidably receiving the rod 122 while the flange 132 has an upstanding portion 134 extending above the flange 130 and having a pin 136 mounted therein and projected through the slot 124. A suitable spacer 138 (FIGURE 9) may be interposed between the flange 132 and the flange 94, while a retaining clip 140 may be secured to the pin 136 on the opposite side of the flange 94. The finger members have connection with the flanges 94 and are slid along the rod pursuant to transverse adjusting movements of the side guides 68. The pin 136 and rod 122 form vertically spaced elements engaging the marginal edges of the slot 124 at corresponding vertically spaced points for maintaining the finger member 126 constantly in a predetermined position about the axis of the rod 122, in all positions of elevation of the finger member, it being understood that the assembly of these elements ride in the slots *and cause the*

Figure 2:
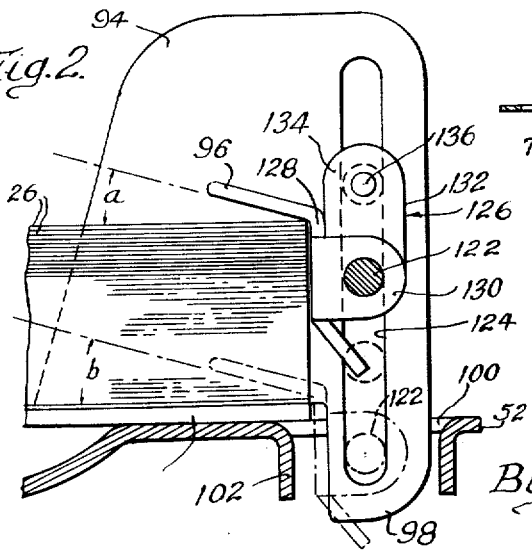
FIGURE 2 is a large scale sectional view taken on line 2—2 of FIGURE 5.
Figure 8:
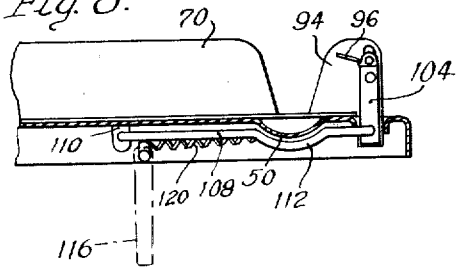
FIGURE 8 is a view similar to FIGURE 7 but with certain elements in different positions.

*fingers to move vertically throughout their range of* [in the] raising and lowering movements [of the post 104]. These raising and lowering movements are indicated in FIGURES 2, 8 and 9, the uppermost position being that of FIGURE 8 where the pin 136 is adjacent the upper end of the slot 124, while in the lowermost *dotted line* position of FIGURE 2, the rod 122 is adjacent the lower end of the slot.

The finger 96 is constituted by an extension of the web 128. The web 128 is disposed vertically and its outer surface (left, FIGURE 2) lies in a vertical plane adjacent to the surface 106 (FIGURES 5 and 8) of the post 104, but preferably spaced slightly therefrom toward the leading end of the feed table. After the stack of copy sheets is placed on the feed table, and the handle 116 is released as described above, the assembly of the post 104, rod 122 and finger members 126, lowers under the action of gravity to a position in which the fingers 96 engage the top sheet of the stack. This position is shown in FIGURE 2.

The fingers 96 are disposed at predetermined angles indicated at a to the horizontal or the plane of the copy sheets. This angle is a known quantity, for best results in controlling the release of the copy sheets from the stack in feeding of the copy sheets by the feed wheels 38. The present invention includes an additional and advantageous feature in a novel arrangement for maintaining this angle constant in all positions of elevation of the fingers 96. The angle indicated at b in FIGURE 2, is that angle the fingers 96 make with the last copy sheet on the table. This angle is the same as angle a. The finger members 126 are maintained constantly in the same predetermined position *throughout their range of raising and lowering movements* by virtue of the vertical spacing of the rod [132] *122* and pins 136 engaging the marginal edges of the vertical slot 124.

Figure 10:
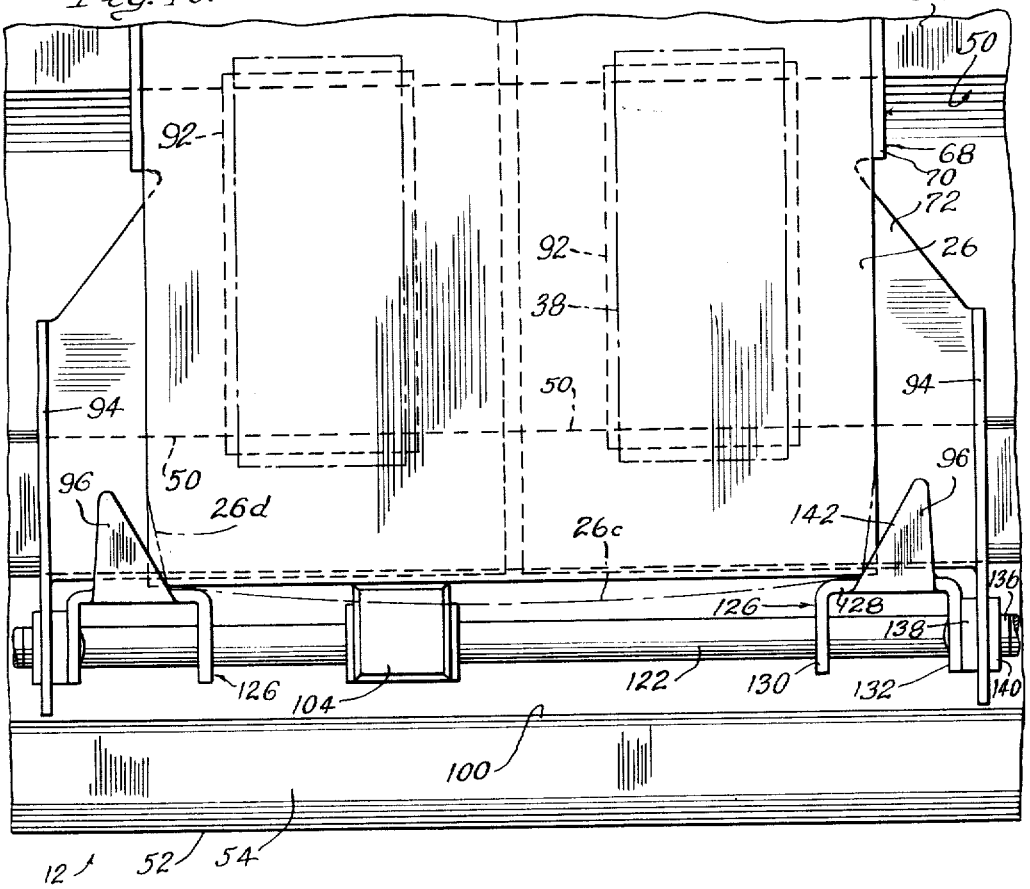
FIGURE 10 is a large scale plan view of that portion of the feed table located at the right central portion of FIGURE 5, with a stack of copy sheets thereon.

The fingers 96 are of a certain predetermined shape and are located at predetermined positions, transversely of the respective side guides 68. This relationship is best shown in FIGURES 5, 9 and 10 where the fingers 96 are shown to have counterpositioned inclined edges 142. The fingers are positioned generally in longitudinal alignment with the flanges 70 and the inclined edges 142 intersect, in plan view, the corner portions of the copy sheets, overlying the copy sheets only a small extent, as shown in FIGURE 10.

As the feed wheels 38 rotate (counterclockwise, FIGURE 1) they move the top copy sheet from the stack; the leading edge thereof, indicated at 26c in FIGURE 10, leads off of the stack and its center portion projects beyond the leading edge of the stack. The corners of the top copy sheet are temporarily gripped and caught under the fingers 96 so that the leading edge not only projects beyond the leading edge of the stack but lifts therefrom as indicated in FIGURE 9. The leading portions of the side edges of the top copy sheet, as indicated at 26d, are deflected inwardly from the side edges of the stack, and this compound movement of the leading portion of the top copy sheet releases the corner portions thereof from the fingers 96. Upon this release the leading end portion of the top copy sheet snaps and straightens so that upon being fed by the feed wheels 38, it lis generally flat, and is thereafter deflected by one or the other or both of the deflectors 30 and 32 (FIGURE 1) into the space between the terminal portions 34 thereof. FIGURE 10 is of large scale and shows copy sheets 26 of nearly minimum width, the side guides being moved toward each other to nearly abutting engagement. The feed wheels 38 shown superimposed in FIGURE 10 are in register with the apertures 92 in the side guides and with the trough 50.

The angle at which the fingers 96 engage the top copy sheet determines the accuracy with which the fingers control the release of the copy sheets. In previous known devices is which the members such as the fingers 96 move in an arcuate path, the angle between the fingers and copy sheets changes continuously throughout the range of lowering movement of the fingers. In the present instance, since *the fingers move along a vertical path* this angle is maintained constant, the control exercised on the copy sheets is constant and hence more accurate. In my co-pending application, Serial No. 795,497, filed February 26, 1959, referred to above, there is disclosed and claimed means for varying the pressure of the feed wheels 38 on the copy sheets. Where only a single value of pressure can be produced by the feed wheels, difficulty is encountered since it is desired to utilize different pressures for copy sheets of different weights or thicknesses; for example, the pressure found best for thin copy sheets is insufficient for properly feeding thick copy sheets, while if the pressure is predetermined for thick copy sheets, more than one thin copy sheet may be fed at a time.

The angle between the fingers 96 and copy sheets is an important factor in the control of the release of the sheets, whether the sheets are thin or heavy, and where that angle is maintained constant as in the present case, the control is maintained constant, but if the angle should vary as in prior known devices, the control will be defective.

The finger members 126 and the post 104 are so relatively dimensioned and positioned that when the fingers 96 engage and rest on the stack, as viewed in FIGURE 9, the top of the post 104 is below the top of the stack. Accordingly, the top sheet will readily pass over the post in the feeding operation. However, this difference in height is relatively small so that maximum height of the post is provided for positive butting engagement by the copy sheets *for properly positioning and locating the same when the post is in its raised locating position* and corresponding [accurate] *arcuate* positioning of the copy sheets throughout a maximum portion of the stack. The post 104 provides greater control of the copy sheets in the stack, and produces more uniform feeding of the copy sheets. The finger members [26] *126*, rod 122 and post 104 form an assembly movable as a unit and lowering under the action of gravity pursuant to depletion of the stack of copy sheets. The height of the assembly is of course controlled by the height of the stack through engagement of the fingers on the stack. The rod and post and the greater portion of the finger members 126 in their lowering movement drop through the transverse slot 100 to enable the lowermost copy sheet to pass over them and off of the feed table. This assembly possesses substantial weight, a considerable portion of which is provided by the post, assuring lowering movement of the fingers against any tendency toward sticking or binding. The rocking movement provided for the rod 122 in a transverse vertical plane, enables the fingers 96 to even themselves and impose equal pressure on the copy sheets.

While I have shown herein a preferred embodiment of the invention, it will be understood that changes may be made within the scope of the appended claims.

I claim:

1. In a device of the character disclosed, a feed table adapted for mounting on a duplicating machine for placing a stack of copy sheets thereon and for feeding the copy sheets therefrom to the [duplication] *duplicating* machine, a pair of side guides mounted on the feed table for laterally adjusting movements and confining the copy sheets against lateral displacement, and means solely at a leading end of the feed table for controlling release of the copy sheets from the feed table, including a transverse rod, said side guides having slots receiving the end portions of the rod and accommodating vertical movements of the rod, fingers on said rod positioned adjacent the leading end of the stack of sheets to engage the face of the uppermost sheet of the stack at the side edges of the sheet, a post connected with said rod between said fingers and movable vertically with said rod and fingers and forming stop means engaged by the leading edge of all but a relatively small number of copy sheets at the top of the stack, and positively blocking those copy sheets engaging it, said post constituting the sole element disposed ahead of and engaged by the leading edge of the copy sheets, and manually actuated means for raising the assembly that includes the rod, fingers and post.

2. The invention set out in claim 1 including means connected with said fingers and having vertically spaced points of engagement with the edges of said slots whereby to maintain said fingers in constant relation to the supporting surface of the feed table in all positions of elevation of the fingers.

3. The invention set out in claim 1 in which said side guides have main portions engageable with the side edges of the copy sheets and portions at the leading end of the feed table spaced laterally outwardly of the main portions in which said slots are formed, said leading end portions accommodating said fingers inwardly thereof whereby to dispose the fingers generally in line longitudinally with the side edges of the copy sheets.

4. In a device of the character disclosed, a feed table adapted for mounting on a duplicating machine and adapted for supporting a stack of copy sheets for feeding of the copy sheets therefrom to the duplicating machine and having a leading end disposed to the duplicating machine and over which the copy sheets are moved in being fed to the duplicating machine, means for confining the copy sheets at the sides against lateral displacement, means at the leading end of the feed table for controlling release of the copy sheets therefrom including a post disposed intermediate the side edges of the copy sheets and positioned for engagement by the leading edge of the copy sheets, said post being movable vertically and extending through an opening in the feed table, an arm disposed under the feed table pivoted thereon at one end and connected at its other end to the post, a crank mounted on the feed table on the under side thereof with a handle exposed for manual manipulation for swinging said arm and thereby raising said post, and finger members mounted for conjoint vertical movement with said post and having fingers adapted to engage and rest on the stack of copy sheets, said post and finger members being so relatively proportioned and positioned that when the fingers are resting on the stack the upper end of the post is adjacent to but below the top of the stack, said post constituting the sole element disposed ahead of and engaged by the leading edge of the copy sheets.

5. In a device of the character disclosed, a feed table adapted for mounting on a duplicating machine and supporting a stack of copy sheets for feeding the copy sheets therefrom to the machine over a leading end of the feed table by means of frictional wheels adjustable transversely of the feed table, a pair of laterally adjustable side guides for engaging copy sheets on the feed table and confining them against lateral displacement, said side guides having front ends adjacent the leading end of the feed table, the feed table having a transverse trough extending throughout the range of transverse adjustment of the friction wheels for receiving the lower portions of the feed wheels after the last copy sheet has left the feed table whereby the feed wheels, regardless of their adjusted position transversely, are enabled to drop to a position with their lower portions extending below the supporting surface of the feed table, and means for controlling the release of copy sheets from the feed table, including elements engaging the leading ends of the sheets and interconnected with the side guides for lateral movement therewith in the lateral adjusting movements of the side guides and so positioned relative to the side guides as to engage the sheets at the side edges thereof.

6. The invention set out in claim 5 in which the side guides have vertical flanges engaging the edges of the copy sheets and lower horizontal flanges disposed under the side portions of the copy sheets, said lower horizontal flanges have openings in register with said trough for receiving said feed wheels therethrough whereby to enable the feed wheels to be positioned adjacent the lateral edges of the copy sheets.

7. A device of the character disclosed comprising a feed table for mounting on a duplicating machine with a leading end disposed to the machine for feeding of copy sheets therefrom over the leading end into the machine by means of friction wheels adjacent the leading end and engageable with the top copy sheet of a stack thereof on the feed table, a pair of side guides mounted on the feed table for transverse adjusting movements for confining the copy sheets against lateral displacement and each having a vertical flange engaging the edges of the copy sheets and a bottom horizontal flange disposed under the side portions of the stack of copy sheets, the feed table having a transverse trough and the bottom horizontal flanges having openings in register therewith to receive the bottom portions of the friction wheels whereby to enable them to extent below the top surface of the feed table pursuant to removal of the last copy sheet of the stack on the feed table, a post vertically movable through an opening in the feed table at the leading end thereof, an arm below the feed table and pivoted at one end thereon and having its other end pivotally connected with the post, a transverse crank with an exteriorly accessible handle operative for swinging said arm and raising said post, a transverse bar mounted intermediate its ends in said post and extending through vertical slots in said side guides, finger members mounted on said *bar* [rod] on opposite sides of said post having fingers extending at a predetermined angle to the plane of the feed table upwardly and toward the opposite end of the feed table, and means interconnecting the finger members and side guides including elements engaging the edges of said slots at vertically spaced points for maintaining the fingers constantly at said predetermined angle, said fingers being positioned adjacent the leading end of the stack of sheets to engage the faces of the uppermost sheet of the stack at the side edges of the sheet, and the assembly of post, [rod] *bar* and finger members lowering by gravity pursuant to depletion of the stack, the post and finger members being so relatively dimensioned and positioned that the top of the post is positioned adjacent to but below the top of the stack when said fingers are resting on the stack in all positions of elevation of the post, [rod] *bar* and finger members, said interconnecting means being operative for moving said finger members toward and from each other in response to corresponding movements of the side guides whereby to position the fingers adjacent the side edges of the stack of copy sheets.

8. In a device of the character disclosed, a feed table adapted for mounting on a duplicating machine and supporting a stack of copy sheets thereon for feeding of the copy sheets therefrom over a leading end thereof and through the machine, a pair of finger members, means mounting the finger members at the corners at the leading end of the copy sheets, the finger members having straight flat fingers which when the finger members are mounted as stated have a substantial horizontal component and are inclined rearwardly and upwardly, said fingers also having interfacing straight edges relatively diverging toward the trailing end of the copy sheets, said fingers, when the finger members are so mounted, overlying said corners of the copy sheets with said straight edges diagonally intersecting the corners of the copy sheets when viewed downwardly, said straight edges being the only edges of the fingers so intersecting the copy sheets, the only portions of the finger members that are positioned forwardly of the copy sheets being contained substantially within the forward projection of said straight edges, said mounting means mounting the finger members for movement vertically and the finger members being capable of being lowered by gravity in response to depletion of the stack of the copy sheets, and means maintaining the finger members in such position that the fingers remain in a predetermined angle relative to the supporting surface of the feed table in all positions of elevation of the finger members.

9. The invention set out in claim 8 in which the mounting means for the finger members also mount them for transverse movement toward and from each other, and the table has side flanges which have operative engagement with the finger members each at vertically spaced points and thereby maintain the fingers at said predetermined angle.

10. The invention set out in claim 8 in which the mounting means support the finger members vertically at a common point intermediate the finger members whereby to enable limited rocking movement about the mounting means conjointly and simultaneously in opposite senses in a common transverse vertical plane.

11. The invention set out in claim 10 in which means is provided solely at the leading end of said table for controlling release of the copy sheets from the feed table, including at least a portion of said mounting means which acts as stop means positioned for engagement by the leading edge of all of the copy sheets except a relatively small number at the top of the stack and positively blocking those sheets engaging it, said portion of the mounting means, except for said portions of the finger members, constituting the sole element engaged by the leading edge of the copy sheets.

12. The invention set out in claim 11 in which manual actuated means is provided for raising said stop means and the finger members, and the stop means, after release of the manual actuated means, being supported by the finger members through the engagement of the fingers thereof with the top of the stack whereby the stop means is lowered by gravity pursuant to lowering of the stack and regardless of the height of the stack such stop means terminates upwardly a short distance below the top of the stack.

13. The invention set out in claim 8 in which the means mounting the finger members includes a post extending upwardly through an opening in the feed table to a point slightly below said fingers and movable with the finger members, and the post is positioned slightly rearwardly of said position of the finger members.

*14. In a device of the character disclosed, a feed table adapted for mounting on a duplicating machine for placing a stack of copy sheets thereon and for feeding the copy sheets therefrom over a leading end thereof to the duplicating machine, a pair of side guides mounted on the feed table for laterally adjusting movements and confining the copy sheets against lateral displacement, means at the leading end of the feed table for controlling release of the copy sheets therefrom, including finger members mounted at the leading end of the side guides for movement laterally with the side guides and for vertical movement relative thereto and having guiding engagement therewith, a post mounted for vertical movement intermediate the side guides and adjacent the leading end of the feed table, and manually actuatable means for raising the finger members and post in unison, the finger members and post being lowered by gravity after raising by and release of said manually actuatable means, the post, when in raised position, being operative as a limiting means for engagement by the leading end of a stack of copy sheets placed on the table, and the finger members having fingers engageable with the top sheet of a stack of sheets on the table adjacent the corners thereof and operative for supporting the finger members against gravity and enabling them to lower as the stack is depleted.*

*15. The invention set out in claim 14 in which a lever is pivotally mounted on the table on the under side thereof, the post is mounted on the swinging end of that lever, and the manually actuatable means includes a crank.*

*16. In a device of the character disclosed, a feed table adapted for mounting on a duplicating machine and adapted for supporting a stack of copy sheets for feeding of the copy sheets therefrom to the duplicating machine and having a leading end disposed to the duplicating machine and over which the copy sheets are moved in being fed to the duplicating machine, means for confining the copy sheets at the sides against lateral displacement, means at the leading end of the feed table for controlling release of the copy sheets therefrom including a post positioned for engagement by the leading edge of the copy sheets, said post being movable vertically and extendable below and above the feed table, an arm disposed under the feed table pivoted thereon at one end and connected at its other end to the post, and vertically movable finger members postioned for and adapted to be raised by the lever and having fingers adapted to engage and rest on the stack of copy sheets, manually actuatable means for raising the arm and thereby raising the post and finger members and including a handle exposed to the side of the table, the post, upon being released by the raising means, dropping to a position in which the upper end is below the top of the stack, and the finger members descending by gravity upon depletion of the stack.*

*17. In a device of the character disclosed, a feed table adapted for mounting on a duplicating machine for placing a stack of copy sheets thereon and for feeding the copy sheets therefrom over a leading end thereof to the duplicating machine, a pair of side guides mounted on the feed table for confining the copy sheets against lateral displacement, means at the leading end of the feed table for controlling release of the copy sheets therefrom, including finger members mounted at the leading end of the side guides for vertical movement relative thereto and having guiding engagement therewith, a post mounted for vertical movement intermediate the side guides and adjacent the leading end of the feed table, and manually actuatable means for raising the finger members and post in unison, the finger members and post being lowered by gravity after raising by and release of said manually actuatable means, the post, when in raised position, being operative as a limiting means for engagement by the leading end of a stack of copy sheets placed on the table, and the finger members having fingers engageable with the top sheet of a stack of sheets on the table adjacent the corners thereof and operative for supporting the finger members against gravity and enabling them to lower as the stack is depleted.*

*18. In a device of the character disclosed, a feed table adapted for mounting on a duplicating machine and having a planar surface for supporting a stack of copy sheets thereon and for feeding the copy sheets therefrom over a leading end thereof to the duplicating machine, a pair of side guides mounted on the feed table for confining the copy sheets against lateral displacement, means at the leading end of the feed table for controlling release of the copy sheets therefrom, including finger members mounted for guided vertical movement at the leading end of the side guides and having fingers adapted to engage the top copy sheet of a stack thereof, a post movably mounted intermediate said finger members and adjacent the leading end of said table; means supporting said post for limited movement between fully raised and lowered positions, above and below the planar surface of said table, respectively; said post when in its fully raised position being disposed substantially normal to said planar surface whereat the same serves as a positive stop means abuttingly engageable by the leading end of a stack of copy sheets for positioning said stack and aligning the copy sheets thereof in proper feeding position on said table, and manually actuatable means for simultaneously raising said finger members and post whereby a said stack may be abuttingly engaged with and positioned by said post, as aforesaid, and said fingers are disposed in position for engaging the top copy sheet thereof, said finger members and post being lowered by gravity upon release of said manually actuatable means.*

References Cited by the Examiner

The following references, cited by the Examiner, are of record in the file of this patent or the original patent.

UNITED STATES PATENTS

| | | | |
|---|---|---|---|
| 1,209,110 | 12/16 | Bradshaw | 271—19 |
| 1,512,648 | 10/24 | Stevens | 271—61 |
| 1,561,821 | 11/25 | Bessat et al. | 271—19 |
| 1,567,182 | 12/25 | Chesire | 271—61 |

| | | | |
|---|---|---|---|
| 2,166,272 | 7/39 | Storck | 271—43 |
| 2,343,187 | 2/44 | Jagger | 271—36 |
| 2,654,600 | 10/53 | Ajam et al. | 271—18 |
| 2,783,042 | 2/57 | Picking | 271—61 X |
| 2,795,419 | 6/57 | Ritzerfeld et al. | 271—19 |

M. HENSON WOOD, Jr., *Primary Examiner.*

SAMUEL F. COLEMAN, ROBERT B. REEVES, *Examiners.*